Patented Nov. 2, 1926.

1,605,088

UNITED STATES PATENT OFFICE.

EDSON R. WOLCOTT, OF LOS ANGELES, CALIFORNIA, ASSIGNOR TO THE TEXAS COMPANY, OF NEW YORK, N. Y., A CORPORATION OF TEXAS.

MANUFACTURE OF SULPHURIC ACID.

No Drawing. Application filed December 4, 1924. Serial No. 753,800.

My invention relates to the manufacture of sulphuric acid by the contact process and it comprises a process whereby sulphuric dioxide and oxygen are heated and passed over a catalytic mass of alumina to form sulphur trioxide.

In the manufacture of sulphuric acid by the contact process, it is necessary to oxidize sulphur dioxide to sulphur trioxide, this being accomplished by passing a mixture of sulphur dioxide and air or oxygen over a contact catalyst under the influence of heat. Although there have been numerous contact materials proposed for this purpose the only ones which have proven successful on a commercial scale are iron oxide and platinum. The former is not a particularly efficient catalyst but it has the advantage of being comparatively insensitive to poisoning action; a disadvantage in the use of ferric oxide is the fact that it is usually necessary to pass the residual and unconverted gases from this catalyst over platinum in order that the reaction may go to completion. Platinum is the more effective by far, but it has the disadvantage that it is very expensive and that an exceedingly pure supply of sulphur dioxide is necessary. The slightest traces of arsenic, antimony, selenium and similar substances, which are often present in sulphurous gases, will act as poisons tending to be adsorbed as a tenacious layer upon the active surface and greatly impairing its catalytic value.

I have discovered that aluminum oxide, or alumina, may be advantageously employed as a contact catalyst for the reaction involving the oxidation of sulphur dioxide to sulphur trioxide. In my process I may use the oxide either partially hydrated or in the anhydrous form; however I prefer to use for this purpose a natural occurring hydrated alumina known as diaspore, which is usually represented as $Al_2O_3.H_2O$. By contacting sulphur dioxide gas and air or oxygen with this material under the influence of heat, I have been able to obtain yields of sulphur trioxide which compare favorably with those resulting from the use of platinum under substantially similar conditions. I may use varying proportions of air or oxygen and sulphur dioxide and varying degrees of heat, but I prefer to use an excess of oxygen in the gaseous mixture supplied to the catalyst and to carry out the reaction at temperatures between 450° and 550° C. in order to obtain the highest possible rate of conversion and yield of sulphur trioxide. As the cost of an alumina contact material is normal, it is obvious that there is an enormous economic advantage to be gained by its substitution for platinum and at a comparatively small sacrifice in efficiency.

An important feature of the use of alumina and more particularly the mineral, diaspore, is the comparative lack of susceptibility to the usual catalyst poisons. While sulphur dioxide gases which are to be contacted with platinum must be put through an elaborate system of purification and drying in order to avoid destruction of the essential qualities of the contact mass, such treatment is not necessary when the alumina catalyst is employed. There is no adsorption of the arsenic or related compounds nor is there any appreciable reaction with the sulphurous gases which would cause a change in composition or substance or a loss in activity. Therefore, although the extremely low initial cost might allow a frequent renewal and substitution of fresh material, such change is not necessary in view of the long life and high state of efficiency retained under operating conditions.

Obviously many modifications and variations of the invention, as hereinbefore set forth, may be made without departing from the spirit and scope thereof, and therefore, only such limitations should be imposed as are indicated in the appended claims.

What I claim is:

1. The process of manufacturing sulphur trioxide which comprises passing sulphur dioxide and oxygen over heated diaspore.

2. The process of manufacturing sulphur trioxide which comprises passing a gaseous mixture containing sulphur dioxide and air in contact with diaspore under the influence of heat.

3. In the manufacture of sulphur trioxide by the oxidation of sulphur dioxide, the step that consists in carrying on the oxidation in the presence of diaspore as a catalyst.

In witness whereof I have hereunto set my hand this 22nd day of November, 1924.

EDSON R. WOLCOTT.